May 3, 1960 W. H. CASE 2,935,336
MUD GUARDS AND MOUNTING STRUCTURES THEREFOR
Filed Feb. 4, 1958 2 Sheets-Sheet 1
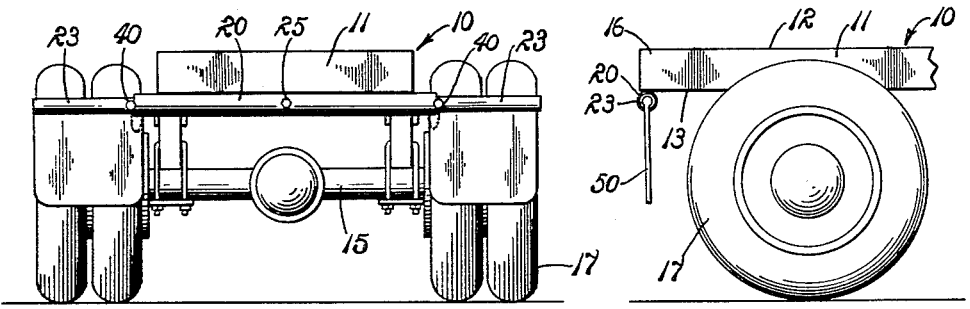
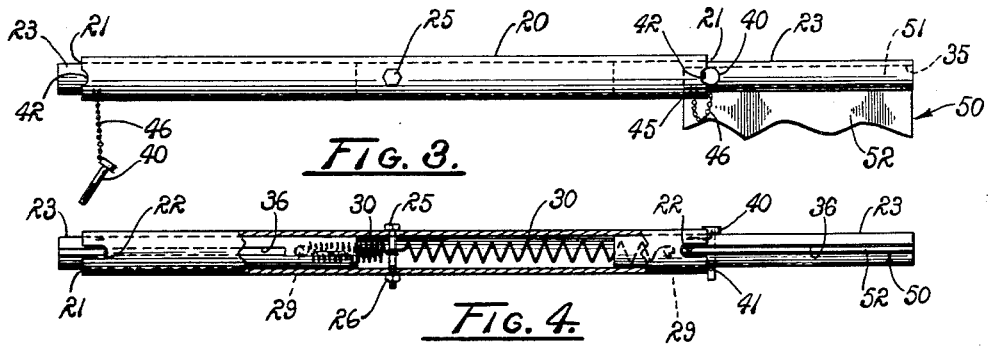
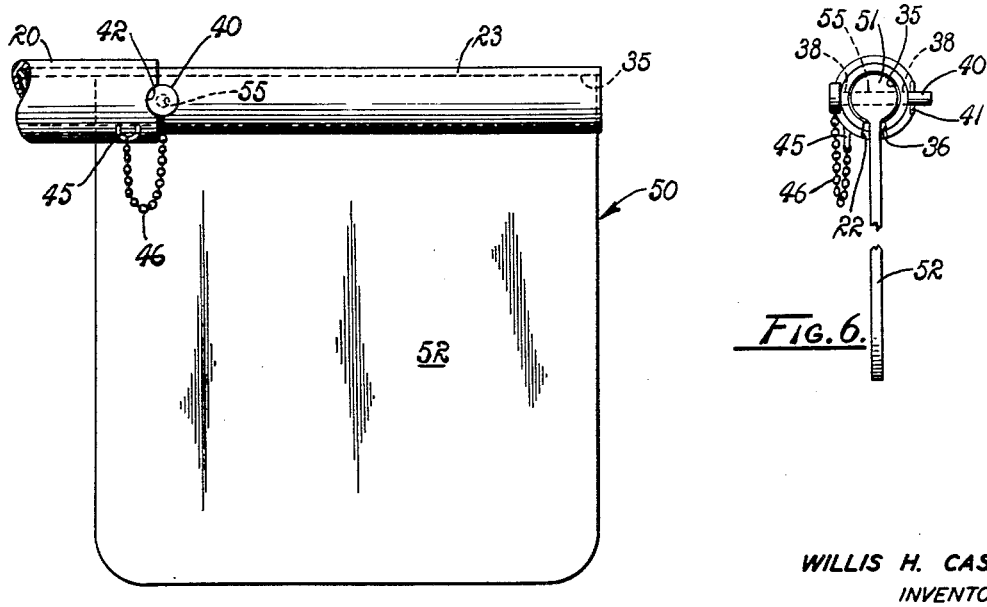
WILLIS H. CASE
INVENTOR
HUEBNER & WORREL
ATTORNEYS May 3, 1960 W. H. CASE 2,935,336
MUD GUARDS AND MOUNTING STRUCTURES THEREFOR
Filed Feb. 4, 1958 2 Sheets-Sheet 2
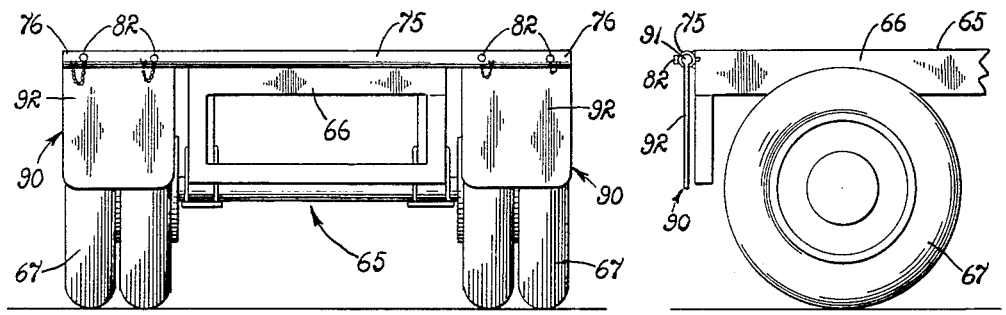
Fig. 7.   Fig. 8.
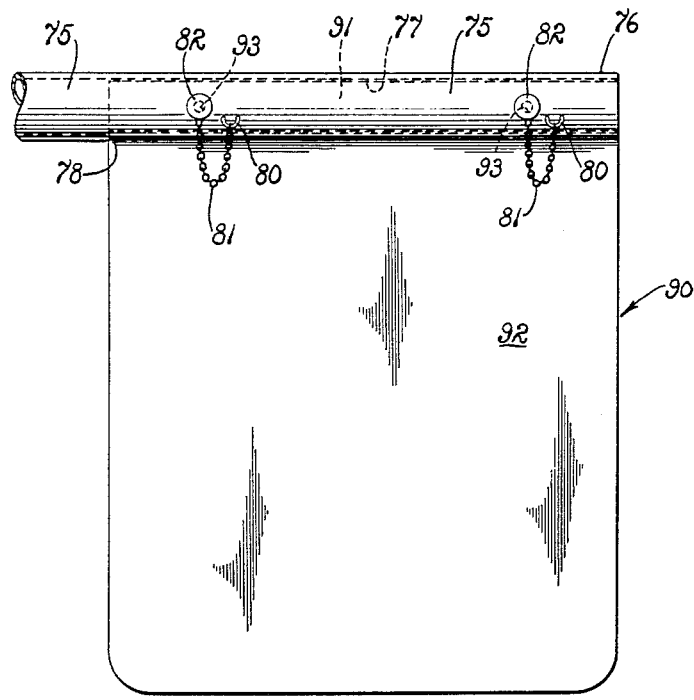 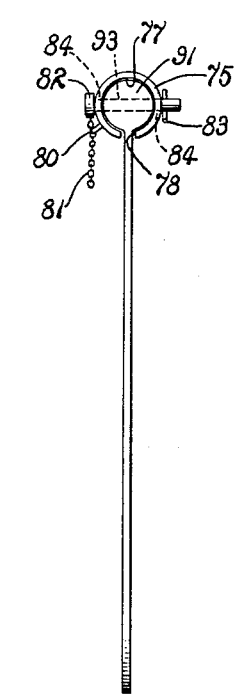
Fig. 9.   Fig. 10.
WILLIS H. CASE
INVENTOR
HUEBNER & WORREL
ATTORNEYS United States Patent Office 2,935,336
Patented May 3, 1960

2,935,336

MUD GUARDS AND MOUNTING STRUCTURES THEREFOR

Willis H. Case, Sanger, Calif.

Application February 4, 1958, Serial No. 713,192

5 Claims. (Cl. 280—154.5)

The present invention relates to mud guards for automotive vehicles and more particularly to such mud guards and mounting structures therefor which present a minimum of interference when not in use and which are adapted for expeditious attachment and detachment from vehicles with which they are employed.

It is conventional to provide mud guards rearwardly of the rear wheels of vehicles, and especially of trucks and tractors, for catching or deflecting mud thrown rearwardly by the wheels during earth traversing movement of the vehicle. Many states have laws requiring vehicles to employ mud guards which set forth specific requirements regarding the mounting of the guards and their spacing from the ground as well as from the rear wheels.

In the past it has been the practice to provide mounting brackets for the guards to which the mud guards are bolted or clamped in some manner. These mounting brackets have not been satisfactory since they have usually been cumbersome structures extended outwardly from the vehicle where they are frequently in the way and often broken by inadvertent contact with obstructions. Further, the installation and removal of the guards have been onerous, time consuming and therefore expensive tasks. It customarily requires approximately four hours to mount the guard holding brackets on a truck or tractor. Once the brackets are installed an additional hour or so is needed to install, to remove and/or to replace the guards on a single vehicle. Not only do the guards frequently need replacement because of wear and other deterioration but in certain instances must be removed or replaced simply because of a change in character of operation of the vehicle on which they are employed. For example, in a tractor and trailer combination, the guards must be employed rearwardly of the rear wheels of the trailer. When the trailer is detached and the tractor operated alone, the guards must be utilized rearwardly of the rear wheels of the tractor. However, when the tractor is again coupled to a trailer, the guards are in the way and must be removed. Thus, the repetition of the installation, removal and replacement aggravates the onerous, time consuming and expensive character of the operation.

Accordingly, it is an object of the present invention to provide improved vehicle mud guards and mounting structures therefor.

Another object is to provide a mounting enabling mud guards to be attached, detached, and/or replaced in a minimum of time.

Another object is to provide a mounting for mud guards on automotive vehicles which presents a minimum of interference when not in use.

Another object is to provide a mounting of the nature described which is easy to install and to operate.

Another object is to provide a mud guard mounting adapted for use on many types of vehicles and especially suited for use on tractors and trailers.

Other objects are to provide a combined mud guard and mounting which are economical to construct, durable in form, dependable in operation, and otherwise highly effective for carrying out their intended functions.

These, together with other objects, will become more readily apparent upon reference to the following description and accompanying drawings.

In the drawings:

Fig. 1 is a fragmentary rear elevation of a tractor on which is provided a device for mounting mud guards embodying the principles of the present invention.

Fig. 2 is a fragmentary side elevation of the tractor, mounting device, and mud guard of Fig. 1.

Fig. 3 is a somewhat enlarged view of the mounting device showing one end thereof in retracted position and the other end in extended position with a mud guard, fragmentarily represented, supported thereby.

Fig. 4 is a view similar to Fig. 3 with portions thereof broken away and in section for showing the internal structure of the device.

Fig. 5 is a somewhat enlarged fragmentary view of an end of the mounting device in extended position and with a mud guard fitted therein.

Fig. 6 is an end elevation of the device and mud guard as shown in Fig. 5 but with the mud guard broken away in the middle for illustrative convenience.

Fig. 7 is a fragmentary rear view of a truck incorporating a second form of the subject invention.

Fig. 8 is a fragmentary side elevation of the portion of the truck, mounting device, and mud guard of Fig. 7.

Fig. 9 is a somewhat enlarged fragmentary view of the second form of mounting device and showing a mud guard fitted therein.

Fig. 10 is an end elevation of the structure shown in Fig. 9.

Referring more particularly to the drawings, a tractor 10 is illustrated in Figs. 1 and 2 as including a frame 11 having a top surface 12 and a bottom surface 13. An elongated axle 15 is mounted underneath the tractor at its rear end portion 16, and pairs of dual wheels 17 are connected to the axle for supporting the frame for earth traversing movement along the path normal to the axle in a well-known manner.

An elongated substantially cylindrical hollow sleeve 20 provides opposite open ends 21 and is rigidly secured, as by welding, to the bottom surface 13 of the frame 11. The sleeve is secured to the frame transversely thereof in substantially parallel relation to the axle and so that the opposite ends terminate closely adjacent to the opposite sides of the frame. Explained otherwise, the opposite ends of the sleeve do not extend laterally outwardly directly behind the wheel 17 but rather terminate inwardly adjacent to the frame. This is best seen by reference to Fig. 1. Further, the sleeve has relatively short, elongated longitudinally extended endwardly opening and downwardly facing notches 22 in opposite ends thereof.

Elongated substantially cylindrical tubes 23 are concentrically individually longitudinally slidably fitted in the opposite ends 21 of the sleeve 20 for movement between retracted positions within the sleeve and positions outwardly extended from the sleeve in rearwardly spaced relation to and directly behind the wheels 17. The tubes have inner ends within the sleeve and outer ends extended outwardly of the sleeve. A bolt 25 is extended transversely through the sleeve intermediate its ends, and a nut 26 is screw-threaded on the bolt. Studs 29 are rigidly mounted transversely within the inner ends of the tubes, and elongated tension springs 30 provide opposite ends connected to the bolt and to the studs for yieldably urging the tubes into their retracted positions.

Each of the tubes 23 has an elongated concentric longitudinally extended bore 35 and an elongated longitudinally extended slot 36 opening from the bore laterally outwardly of the tube. The slots are also open at the outer ends of the tubes. Further, each tube has a transverse bore 38 extended therethrough adjacent to its inner end adapted to receive a latch pin 40 when the tube is in its extended position. Each bore is substantially normal to the plane of the slots in its respective tube. Preferably, the sleeve has a pair of diametrically related, endwardly opening sockets 42 aligned in a substantially horizontal plane normal to the plane of the notches 22 adapted to receive the pins in fitted relation therein so as to resist rotation of the tubes relative to the sleeve, and, of course, so as to hold the tubes in their extended positions. When the bores 38 are aligned with the sockets and the slots are faced downwardly, the slots are in longitudinal alignment with the notches 22. Eyelets 45 are secured, as by welding, to the opposite ends of the sleeve, and chains 46 interconnect the eyelets and the pins 40 so as to prevent their loss when not in use.

Mud guards 50 are provided having substantially cylindrical upper elongated beads 51 and substantially rectangular flaps 52 integral with the beads and radially extended therefrom. If desired, the bead and flap may be provided with suitable metallic or similar reinforcing embedded therein. Preferably, the mud guard is made of resiliently flexible and compressible material, such as rubber, plastic, or the like. The bead of each guard has a bore 55 transversely extended therethrough adjacent to an end of the bead and substantially normal to the flap.

OPERATION

The operation of the described embodiment of the subject invention is believed to be readily apparent and is briefly summarized at this point.

In order to attach the mud guards 50 to the tractor 10 which is equipped with the sleeve 20 and tubes 23, the tubes are pulled outwardly of the sleeve and locked in their extended positions by insertion of the pins 40 in the bores 38 and seating of the pins in the sockets 42 with the slots 36 facing downwardly. Keys 41 are releasably extended through the pins to prevent their inadvertent release. Thereupon, the beads 51 of the mud guards are slidably inserted in the bores 38 with the flaps 52 extended downwardly through the slots 36. In order to permit full insertion of the guards, the pins are temporarily removed, the bores 55 brought into registration with the bores 38, and the pins reinserted through the registering bores. The notches 22 receive the inner edges of the flaps 52 to limit rotation of thet tubes 23 and mud guards 50 relative to the sleeve 20. The pins seated in the sockets 42 also limit such rotational movement. However, the fit of the pins in their respective bores 55 and the flaps in their respective notches is sufficiently loose, and the width of the slots 36 is sufficiently greater than the thicknesses of the flaps 52 that limited forward and rearward rocking movement of the beads in their respective tubes 23 is permitted. In this manner, wear on the flap and the tendency of the mud guard to crack between the bead and the flap incident to flexing of the flap relative to the bead are minimized.

Whenever the tractor 10 is employed as a draft vehicle, it may be desirable to omit the mud guards 50. This would be true, for example, when a trailer, or the like, is drawn behind the tractor. They are very simply removed by releasing the keys 41 and the pins 40, sliding the beads 51 out of the tubes 23, and allowing the tubes to retract. Actually, this is done automatically upon release of the pins inasmuch as the springs 30 pull the tubes into their retracted positions while engagement of the flaps 50 with the sleeve 20 prevent such inward movement of the flaps. With the tubes in their retracted positions, substantially all of the tubes are located underneath the frame 11 instead of behind the wheels 17. Thus, the chances of breaking off or bending the ends of the tubes or sleeve are minimized and this structure is otherwise not in a position to cause interference.

Second form of the invention

The second form of the invention is especially adapted for use on a truck generally indicated by the numeral 65 and including a frame 66 mounted on wheels 67 for earth traversing movement.

This form includes an elongated substantially cylindrical tube 75 rigidly mounted, as by welding, on the rear edge of the frame 66 in transverse relation to the frame and extended outwardly thereof so that its opposite ends 76 are permanently substantially directly behind the wheels 67. The tube provides an elongated concentric bore 77 opening at the opposite ends of the tube and providing a pair of downwardly disposed slots 78 in substantially vertical planes in said opposite ends.

A pair of eyelets 80 are secured, as by welding, to the opposite ends of the tube 75, and chains 81 connect pins 82 to the eyelets. The tube further has a pair of longitudinally spaced, substantially horizontal, transversely extended bores 84 in the ends extended outwardly of the frame.

As before, mud guards 90 are provided and have upper substantially cylindrical beads 91 and substantially rectangular integrally radially extended flaps 92. The mud guards are preferably made of a resiliently flexible and compressible material and likewise may be reinforced by embedding metallic mesh, or the like, therein. The beads of the mud guards have longitudinally transversely extended bores 93 therein.

In the use of the second form of the invention, the mud guards 90 are attached by slidably inserting the beads 91 into the bores 77 of the tube 75 so that the flaps 92 extend downwardly through the slots 78 in rearwardly spaced relation to and directly behind the wheels 67, as best seen in Figs. 7 and 8. The pins 82 are extended through registering bores 84 and 93 and keys 83 are extended through the pins releasably to retain the mud guards in the described positions. As with the first form of the invention and to minimize wear on the flaps, the pins and bores have a sufficiently loose fit and the width of the slots 78 are sufficiently larger than the thicknesses of the flaps as to permit slight forward and rearward rocking movement of the beads in the tube.

It will be evident from the foregoing that mountings have been provided for mud guards which eliminate many of the problems of prior art constructions. The mounting members are themselves easily attached to a vehicle and, especially with the first form of the invention, are substantially unobtrusively positioned on the vehicle so as to present a minimum amount of interference when not in use. The mud guard mounting can be initially installed in a very short time. Commercial embodiments of the subject invention can be installed in about an hour as compared with four hours required with the known prior art. Further, it will be obvious that mud guards can be changed or replaced in a matter of seconds whereas it took as much as an hour to change those of the prior art. The mounting devices are simple and economical and clearly are well suited for accomplishing their intended purposes.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a vehicle including an elongated frame and ground engaging wheels supporting the frame for forward and rearward earth traversing movement in a predetermined path longitudinally of the frame, the combination of an elongated sleeve having an elongated bore extended longitudinally thereof and opening at an end of the sleeve, the sleeve further having a pair of diametrically related sockets in said end of the sleeve and an elongated longitudinally extended notch opening outwardly at said end of the sleeve and being in a plane substantially normal to a plane containing the sockets; means rigidly mounting the sleeve on the frame in rearwardly laterally offset spaced relation to the wheels in substantially horizontal position with the bore extended transversely of the frame substantially normal to said predetermined path of movement, with the notch facing downwardly, with the sockets substantially horizontal, and with said end of the sleeve terminating in closely adjacent relation to the frame; an elongated substantially cylindrical tube having inner and outer ends, an elongated bore opening outwardly of said outer end, an elongated longitudinally extended slot opening at said outer end, and a bore extended transversely of the tube substantially normal to the plane of the slot, the tube being longitudinally slidably fitted within the bore of the sleeve with the inner end disposed within the sleeve and for movement between a retracted position with the outer end of the tube slightly outwardly extended from said end of the sleeve and an extended position spaced rearwardly directly behind one of the wheels of the vehicle with the slot aligned with said notch and with the transverse bore in the tube aligned with the sockets in the sleeve; an elongated tension spring having an end connected to the inner end of the tube and an opposite end; means interconnecting the sleeve and said opposite end of the spring whereby the spring yieldably urges the tube into said retracted position; a mud guard of resiliently flexible and compressible material including an elongated substantially cylindrical upper bead and a substantially rectangular flap integrally radially extended from the bead, the bead having a transverse bore extended therethrough substantially normal to the flap and adjacent to an end of the bead, the bead being longitudinally slidably fitted in the bore of the tube when the latter is in extended position with the flap extended through the slot and into the notch in the sleeve and with the bore in the bead aligned with the transverse bore in the tube; and a locking pin releasably extended through the aligned transverse bores of the tube and the bead and seated in the sockets in the sleeve for releasably holding the tube in extended position whereby the flap is mounted in rearwardly spaced relation to said one wheel.

2. The combination of claim 1 wherein said slot and notch are wider than the thickness of the flap and wherein the locking pin is loosely fitted in said transverse bore in the bead for accommodating limited rocking movement of the head in the tube about a concentric longitudinal axis for the tube.

3. In a vehicle including an elongated frame and ground engaging wheels supporting the frame for forward and rearward earth traversing movement in a path longitudinally of the frame, the combination of an elongated hollow sleeve rigidly mounted on the frame in rearwardly laterally offset spaced relation to one of said wheels; an elongated tube providing a longitudinally extended bore and an elongated longitudinally extended slot opening laterally outwardly of the bore, the tube being slidably coaxially received in the sleeve for longitudinal movement therein between an extended position in rearwardly spaced relation directly behind said one wheel and a retracted position within the sleeve in laterally offset relation to said one wheel; and a mud guard including an upper substantially cylindrical bead releasably longitudinally slidably fitted in the bore of the tube and a flap integral with the bead and extended outwardly through the slot in rearwardly spaced relation to said one wheel when the tube is in extended position, the guard being removable from the tube when the tube is in retracted position.

4. The combination of claim 3 including means mounted within the sleeve and connected to the tube for yieldably urging the tube into said retracted position; and including means releasably engaging the tube and the sleeve for holding the tube in said extended position.

5. In a vehicle providing a frame having forward and rearward portions and opposite sides, and means supporting the frame for earth traversing movement, said means including a ground engaging wheel; the combination of an elongated tube having inner and outer ends providing a longitudinally extended bore opening at the outer end of the tube, the tube also having an elongated longitudinally extended slot opening transversely out of the tube from the bore and also opening at the outer end of the tube; mounting means rigidly mounted on the frame supporting the tube transversely of the frame, with its outer end directed outwardly of the frame for movement transversely of the frame between an extended position located behind the wheel and a retracted position rearwardly laterally offset from the wheel; biasing means connected to the tube yieldably urging the tube into retracted position; a latch releasably engaging the tube and said mounting means in the extended position of the tube for releasably holding the tube in extended position; and a mud guard including a bead releasably longitudinally slidably received in the bore of the tube through the outer open end thereof when the tube is in extended position and including a flap integrally extended from the bead through said slot when the bead is in the bore.

References Cited in the file of this patent

UNITED STATES PATENTS

| | | |
|---|---|---|
| 2,683,612 | Bacino | July 13, 1954 |
| 2,777,710 | Panchesine | Jan. 15, 1957 |